United States Patent [19]

Hansen

[11] Patent Number: 5,499,563
[45] Date of Patent: Mar. 19, 1996

[54] ON-CAR DISC BRAKE LATHE

[75] Inventor: Kim Hansen, Aarslev, Denmark

[73] Assignee: Canvik A/S, Vissengjerg, Denmark

[21] Appl. No.: 304,442

[22] Filed: Sep. 12, 1994

[51] Int. Cl.⁶ .................................................. B23B 5/04
[52] U.S. Cl. ................... 82/112; 82/118; 82/133; 82/134
[58] Field of Search ............... 82/112, 113, 114, 82/118, 119, 133, 134, 115; 29/27 R

[56] References Cited

U.S. PATENT DOCUMENTS

| | | | |
|---|---|---|---|
| 4,226,146 | 10/1980 | Ekman . | |
| 4,452,111 | 6/1984 | Anderson | 82/112 |
| 5,279,192 | 1/1994 | Hartman | 82/112 |

FOREIGN PATENT DOCUMENTS 2109734  11/1981  United Kingdom .

*Primary Examiner*—S. Thomas Hughes
*Attorney, Agent, or Firm*—Antonelli, Terry, Stout & Kraus

[57] ABSTRACT

On-car disc brake lathe unit (2) for simultaneous resurfacing of opposite sides of a brake disc (1) for a wheel without removing the disc but only the wheel and other parts of the brake mechanism, and with a device for rotating the disc, comprising a housing (21) with two synchronous sliding holders (14), each with a tool (15) for resurfacing a disc brake surface; a driving mechanism (10, 12) for the sliding holders comprising an electric motor and a gear between the electric motor and the sliding holders and an adjustable device (18) for controlling the current to the electric motor in relation to the position of the resurfacing tools (15).

4 Claims, 5 Drawing Sheets

ON-CAR DISC BRAKE LATHE

BACKGROUND OF THE INVENTION

The invention relates to an on-car disc brake lathe for simultaneous resurfacing of opposite sides of a brake disc for a wheel without removing the disc but only the wheel and some parts of the brake mechanism.

Such tools are often portable and are used in garages for the renovation of used brake discs without removing the discs from the automobile. After a certain working time when a brake disc is so worn down that the brake mechanism does not function optimally anymore, the brake disc must be replaced or renovated on both sides while, of course, at the same time the rest of the brake mechanism is inspected, adjusted and possibly repaired.

U.S. Pat. No. 4,226,146 and U.K. patent application No. 2,109,734 show examples of portable on-car disc brake lathes. The devices are used by removing the wheel and likewise by removing the brake-calipers, after which the brake-caliper mounting holes in the wheel suspension are used to secure the disc brake lathe unit.

Known devices of this type are often operated manually. By means of a hand wheel or the like and a gear mechanism the mechanic thus moves the resurfacing tools across the surfaces of the brake disc while the brake disc is being rotated simultaneously. However, there are motor-driven devices on the market which compared to the manual devices have the advantage that a more uniform resurfacing is achieved, among other things because of the automatic feeding of the tools.

However, devices with automatic feeding of the tools are encumbered with the drawback that they require supervision, so that the mechanic must be ready to stop the device when the situation demands such action, for example when the resurfacing tool has reached the central area of the disc or when the tools are guided in the opposite direction, i.e. outwards, as the motor in the disc brake lathe unit must be stopped in due time to avoid that the unit is damaged. Consequently, these devices require that the mechanic operates the device all the time or at least stays in the immediate vicinity to be able to stop the device in due time.

SUMMARY OF THE INVENTION

By configuring the disc brake lathe according to the invention an improved device is achieved having a higher degree of automation and offering a greater certainty of correct resurfacing of the brake discs. The higher degree of automation reduces the consumption of resources; while the disc brake lathe machines a brake disc, the mechanic may be making another wheel ready or doing some other work, as the disc brake unit according to the invention stops automatically when the resurfacing process is finished.

The positioning member is adjusted in a very simple manner and does not require any prior measurements or the like.

The automatic function moreover provides the possibility of applying a lower feeding of the tools in relation to the number of revolutions of the brake disc, the result being an absolutely optimum resurfacing of the brake disc. At the same time the process does not occupy all of the mechanic's time as he can do other work while a brake disc is being resurfaced.

Additionally, the disc brake lathe unit according to the invention provides increased security in the garage against accidents, maltreatment of brake discs etc.

DESCRIPTION OF THE PREFERRED EMBODIMENT

Figure 1:
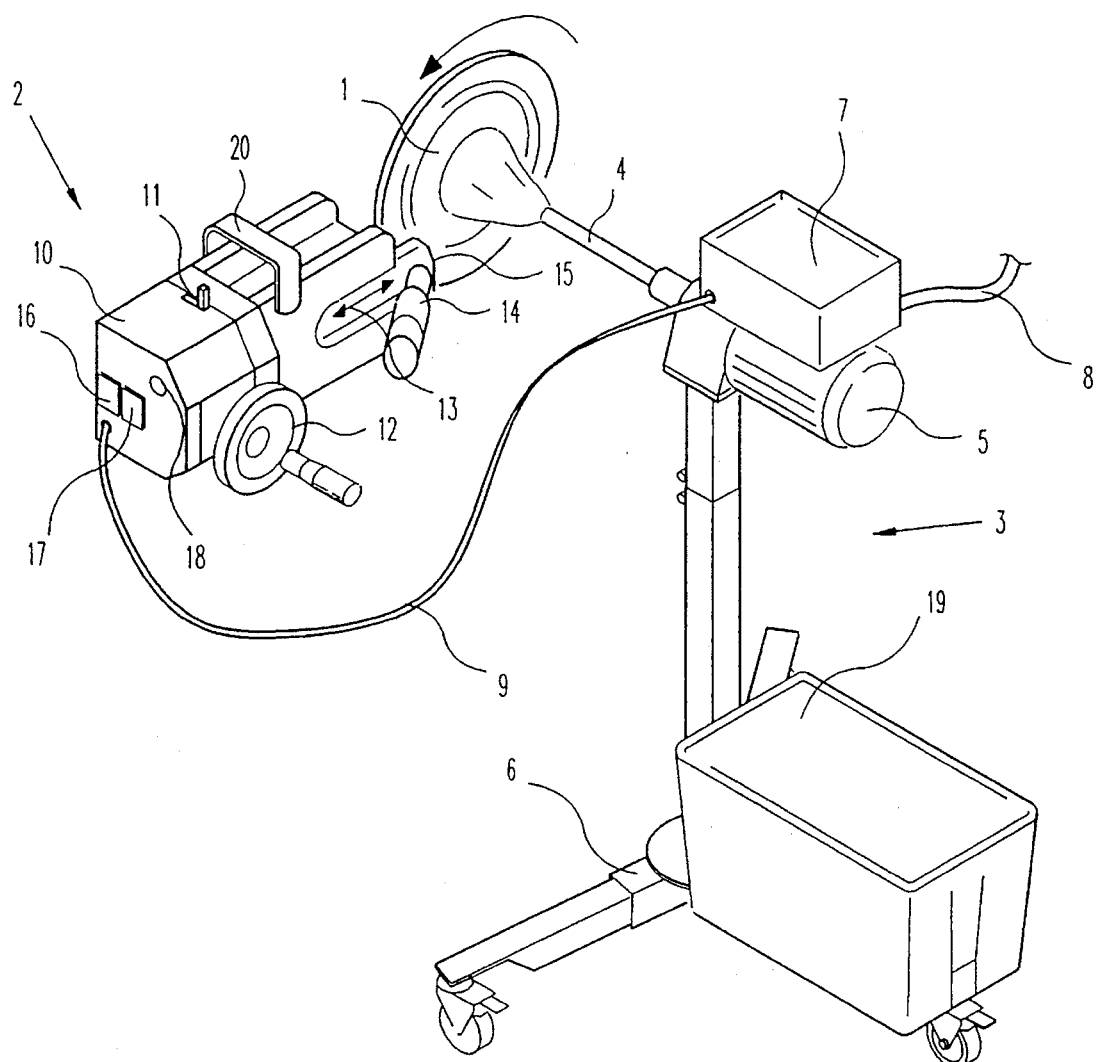
FIG. 1 shows schematically a resurfacing process of a brake disc applying an on-car disc brake lathe according to the invention.

FIG. 1 shows the resurfacing process applying a disc brake lathe according to the invention. A wheel and the brake-calipers are removed from an automobile (not shown), so that the brake disc 1 which remains mounted on the wheel axle can be resurfaced. Thus, with the device according to the invention it is possible to resurface a brake disc without removing it from the automobile.

A disc brake lathe unit 2 is mounted by means of bolts (not shown) etc. on the wheel suspension in the holes which are free now as the brake-calipers have been removed. On each side the unit 2 has a tool holder 14 with a tool 15, for example a negative rake carbide cutting tip of a generally know type with six cutting edges. These carbide cutting tips are used for the resurfacing of the surface of the brake disc.

The brake disc 1 is caused to rotate by a motor unit 5 through a shaft 4 in a generally known manner. The motor unit 5 is controlled and supplied with power by a unit 7, which through a power line 8 is connected to the power mains. The motor unit 5 is a part of a collected drive unit 3 placed on a tripod 6 with wheels which can be locked. The tripod may comprise a storage box 19 for the storing of the disc brake lathe unit 2 and any accessories.

The disc brake lathe unit 2 comprises a motor housing 10 under which is situated an electric geared motor, which through an electric cable 9 is supplied with power by the unit 7, for example 12 volt DC. By means of a shift lever 11 the geared motor can be brought into engagement with the sliding holders 13 where the tool holders 14, and tools 15 are mounted.

Additionally, the disc brake lathe unit 2 comprises a hand wheel 12 which likewise by means of the shift lever 11 can be brought into engagement with the sliding holders 13. The reference numeral 16 denotes an on/off lamp which is switched on when the geared motor in the housing 10 has been started by means of the 3-position switch 17, so that the sliding holders 13 are either guided towards the centre of the brake disc 1, or away from the centre.

The disc brake lathe unit 2 finally comprises a handle 20 and a further essential member 18 which is a setting device for stopping the geared motor 30 in the housing 10 as explained later in connection with FIGS. 2–5 of the drawing.

Figure 2:
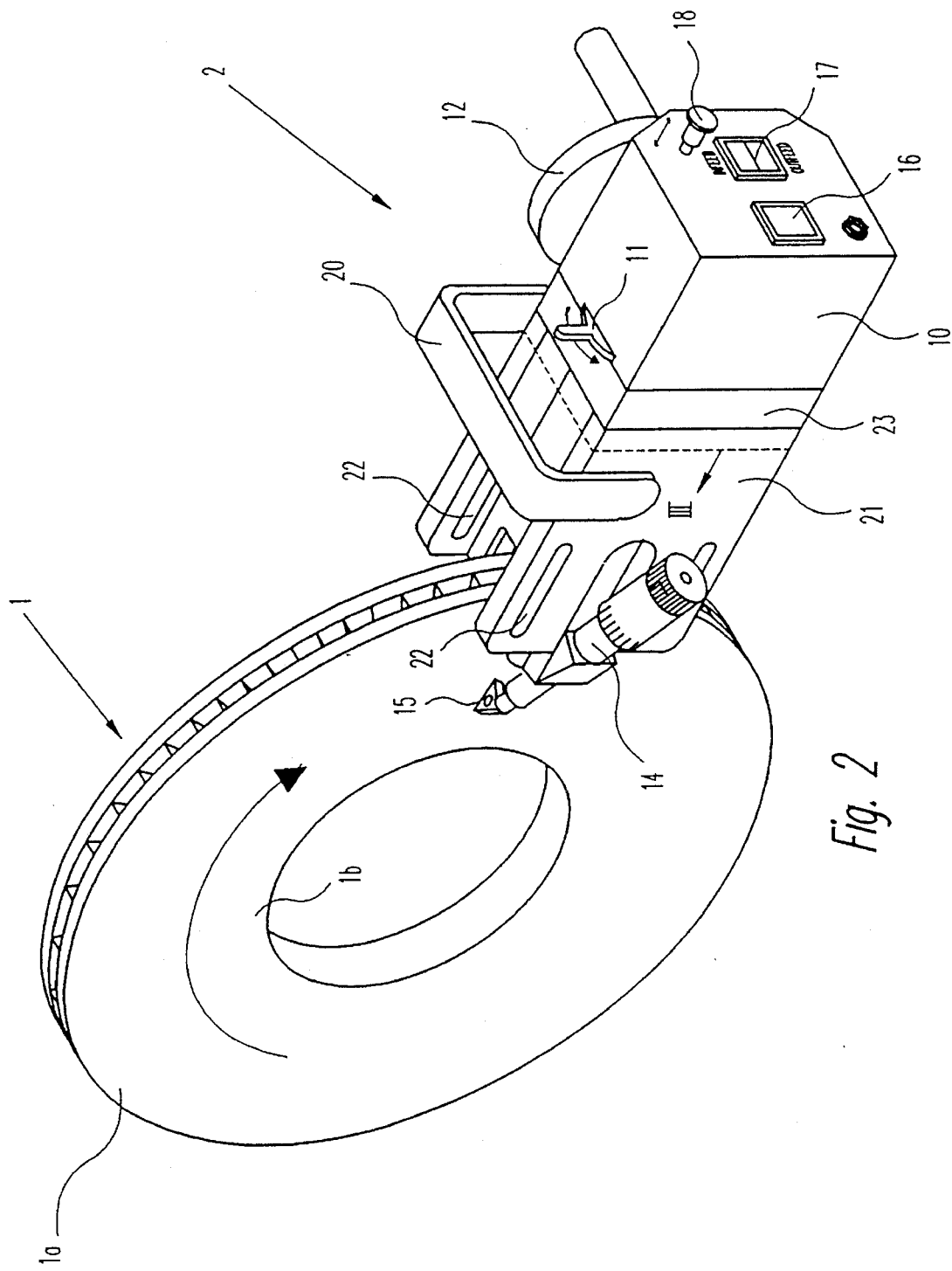
FIG. 2 shows the actual resurfacing unit in the process of machining a brake disc and besides, seen from the opposite side compared to FIG. 1.

FIG. 2 shows the disc brake lathe unit 2 alone and in the process of resurfacing a brake disc 1. In addition to the already mentioned parts, the unit 2 comprises a housing 21 in which is shown oblong mounting holes 22, which are used for the mounting of the unit 2 on the wheel suspension of an automobile.

Between the housing 21 and the gear housing 10 is seen a motor plate 23 which forms the basis for the mounting of the geared motor, further toothed wheels etc., which are explained in further detail in connection with FIGS. 4 and 5 of the drawing. A setting device 18 is moreover shown in further detail, which device can be moved in the direction shown by the double-arrow for the setting of the above-mentioned positioning member, which can stop the geared motor in the housing 10 by switching off the power supply to the motor.

Figure 3:
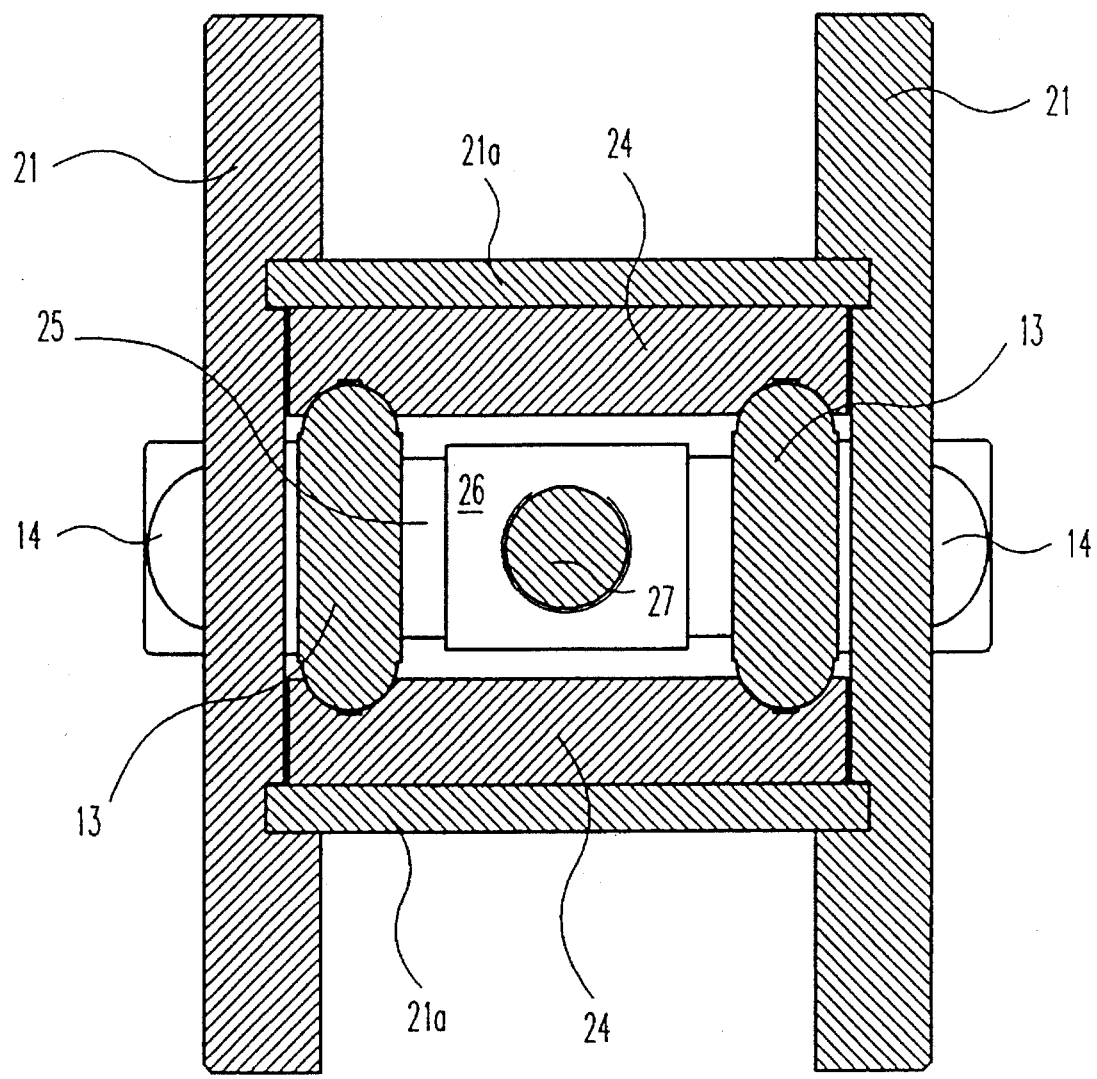
FIG. 3 shows a plane section III—III in FIG. 2 on a larger scale.

In FIG. 3 is seen a section through the housing 21 comprising transverse housing parts 21a which support the adjustable guides 24 for the two sliding holders 13 on which the tool holders 14 are secured. The two sliding holders 13 are coupled firmly together by a bridging part 25 which centrally comprises a threaded sleeve 26 for a threaded spindle 27. If the threaded spindle 27 is turned, both sliding holders 13 will simultaneously be guided either out of or into the housing 21, cf. FIG. 2.

Figure 4:
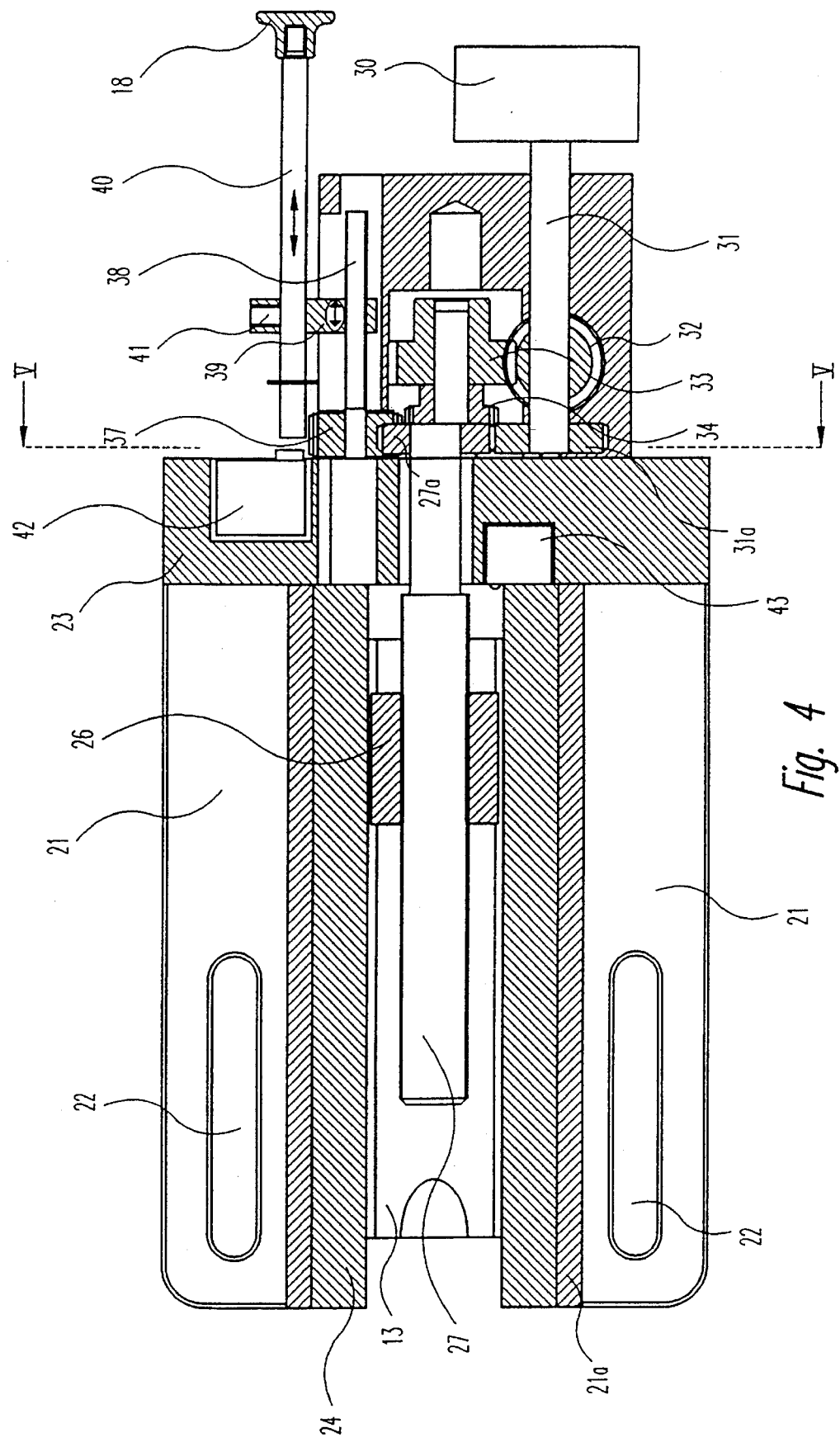
FIG. 4 is a partly sectional side view of the resurfacing unit on a larger scale, so that the most essential parts are visible.

In FIG. 4 is seen a sectional side view of the housing 21 where the threaded spindle 27 for the sliding holders 13 with the threaded sleeve 26 are clearly visible. The threaded spindle 27 reaches through the motor plate 23 and ends in a toothed wheel 27a. An electric DC-geared motor 30 with built-in reduction gear and an output shaft 31 with a toothed wheel 31a is mounted on the motor plate 23. Additionally, an axle 32 from the hand wheel 12 is shown in engagement with a toothed wheel 33 which is coupled to another toothed wheel 34. In addition to this is shown one of several intermediate toothed wheels 37, in that the intermediate toothed wheel 37 shown is coupled to a further threaded spindle 38.

The threaded spindle 38 comprises a positioning member 39 in the form of a metal member with a threaded hole, so that the positioning member 39 can be guided along the threaded spindle 38 when this is rotated. Thus, the positioning member 39 is always in a position on the spindle 38 which reflects the position of the tools 15 accurately. Through a transverse hole the positioning member 39 is coupled to an axle 40. This coupling comprises a friction adjustment screw 41 providing the possibility of displacing the axle 40 in relation to the positioning member 39 by means of the setting device 18. At the end of the axle 40 is shown a microswitch 42 which can be actuated by the axle 40 if this is guided towards the microswitch. The microswitch 42 is arranged to cut off the power to the geared motor 30. Additionally is shown a microswitch 43 which can be actuated by one of the sliding holders 13 when this is guided into the housing 21. The microswitch 43 is also arranged to cut off the power to the geared motor 30.

Figure 5:
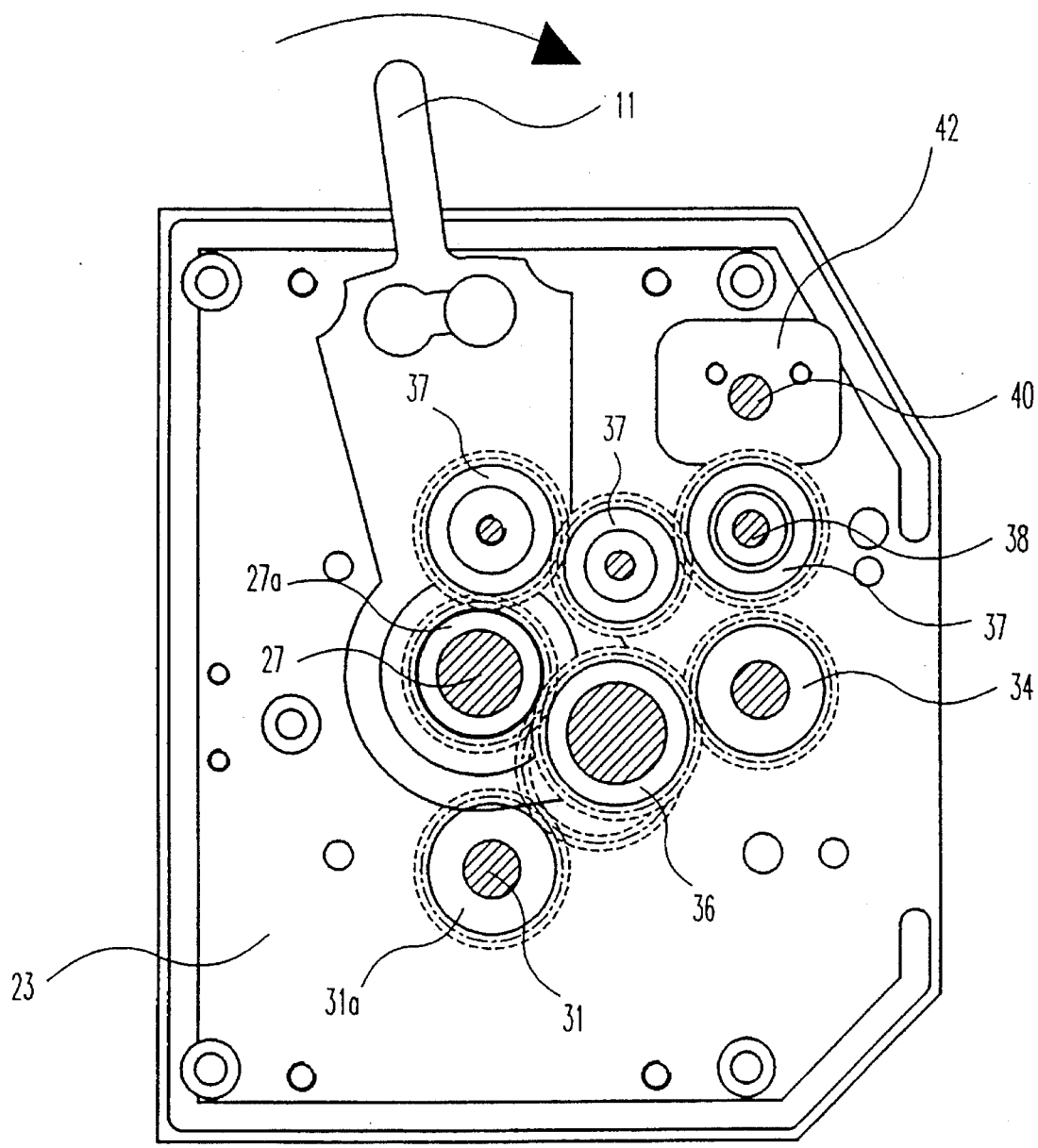
FIG. 5 shows a plane section V—V in FIG. 4.

FIG. 5 shows the motor plate 23 with the shift lever 11. The shift lever 11 comprises a freely rotatable toothed wheel 36 which by means of the shift lever can be moved between the shown and the sketched positions.

When the shift lever 11 is in the position shown in FIG. 5, the hand wheel (not shown) 12 is coupled to a toothed wheel 27a mounted firmly on the spindle 27 through the toothed wheel 34 and the toothed wheel 36 on the shift lever 11. In the position shown the disc brake lathe unit can be operated manually by means of the hand wheel 12.

If the shift lever 11 is moved to its second position, the toothed wheel 36 becomes disengaged with the toothed wheel 34 and instead it enters into engagement with a toothed wheel 31a mounted on the output shaft 31 from the geared motor 30. A mechanical connection is now established from the geared motor 30 through the toothed wheel 31a, the toothed wheel 36 to the toothed wheel 27a and thus to the threaded spindle 27. The geared motor 30 can now rotate the spindle 27 for a change of the feeding of the tools 14, 15.

Additionally, three toothed wheels, all marked 37, are shown which are in permanent engagement with each other and with the toothed wheel 27a on the threaded spindle 27. Thus, the toothed wheels 37 always rotate simultaneously with the threaded spindle 27. The threaded spindle 38 explained in connection with FIG. 4 is firmly mounted on the last of the toothed wheels 37.

SHORT DESCRIPTION OF THE USE OF THE DISC BRAKE LATHE UNIT ACCORDING TO THE INVENTION

First the disc brake lathe unit 2 is mounted as shown in FIGS. 1 and 2, after which the resurfacing of the brake disc can start.

1) The shift lever 11 is set for manual operation through the hand wheel 12.
2) The rusty edge 1a (see FIG. 2) along the outer rim of the brake disc 1 is removed.
3) The rusty edge 1b (see FIG. 2) at the central opening of the brake disc 1 is removed.
4) While the tools 15 are still in the area 1b, the setting device 18 is adjusted by pushing it as far as possible inwards, i.e. until it actuates the microswitch 42.
5) The shift lever 11 is set in its second position, i.e. the position where the geared motor 30 is in engagement with the spindle 27.
6) The tool holders 14 are set in such a manner that a chip of approx. 1/10 mm can be removed from both sides of the brake disc 1.
7) The 3-position switch 17 is set in the position "outfeed" and the resurfacing of the brake disc 1 is started.
8) When the sliding holder 13 actuates the microswitch 43, the power to the geared motor 30 is cut off and the first part of the resurfacing process is finished. Besides, the tool 15 is now completely free of the brake disc 1.
9) The tool holders 14 are set for a further chip of approx. 1/20 mm and the 3-position switch 17 is set in the position "infeed", after which the second and final resurfacing of the brake disc is started, as the geared motor 30 starts.
10) When the microswitch 42 is actuated by the axle 40, the geared motor 30 stops automatically and the resurfacing of the brake disc 1 is finished. Because of the friction between the axle 40 and the positioning member 39, the position of the axle 40 as set in stage 4 is "remembered", so that the geared motor 30 will always stop before the tools 15 reach too far towards the centre of the brake disc 1.

I claim:

1. An on-car disc brake lathe for simultaneous resurfacing of opposite sides of a brake disc for a wheel without removing the disc but only the wheel and other parts of the brake mechanism, comprising:

means for rotating a brake disc on a vehicle, and
   a disc brake lathe unit adapted to be mounted on a wheel suspension of the vehicle for resurfacing the brake disc on the vehicle that is rotated by said means for rotating, said disc brake lathe unit including:

a) a housing with two synchronous sliding holders, each with a tool for resurfacing a disc brake surface, b) means for driving the sliding holders in both an infeed direction and an outfeed direction with respect to the brake disc to be resurfaced, said means for driving comprising an electric motor and a gear between the electric motor and the sliding holders, c) means for controlling the current to the electric motor in relation to the position of the resurfacing tools during infeeding to stop infeeding at a predetermined position when said tools approach the central area of the brake disc, which is not to be resurfaced, d) a microswitch for controlling the current to said electric motor in relation to the position at the resurfacing tools during outfeeding when the tools are moved in the direction away from the central area toward the edge of the disc, and e) positioning means permitting an operator to adjust the location of said predetermined position of which infeeding is stopped by said means for controlling while said disc brake lathe unit is mounted on said wheel suspension of the vehicle for resurfacing the brake disc on the vehicle.

2. An on-car disc brake lathe according to claim 1, wherein the means for controlling the current to the electric motor comprise a threaded axle in engagement with said gear, which threaded axle is in engagement with a positioning means arranged to actuate an electric switch.

3. An on-car brake lathe according to claim 2, wherein the electric switch is a microswitch which can cut off the power to said electric motor.

4. An on-car disc brake lathe according to claim 1, wherein the positioning means comprises a positioning member which is in frictional engagement with a threaded member.

* * * * *